G. L. LOTZ & J. W. KREMER.
AUTOMOBILE LOCK.
APPLICATION FILED NOV. 3, 1914.

1,147,634.

Patented July 20, 1915.
2 SHEETS—SHEET 1.

WITNESSES:
O. Johnson
Frank Warren

INVENTORS
George L. Lotz
John W. Kremer
BY
C. S. Haskins
ATTORNEY

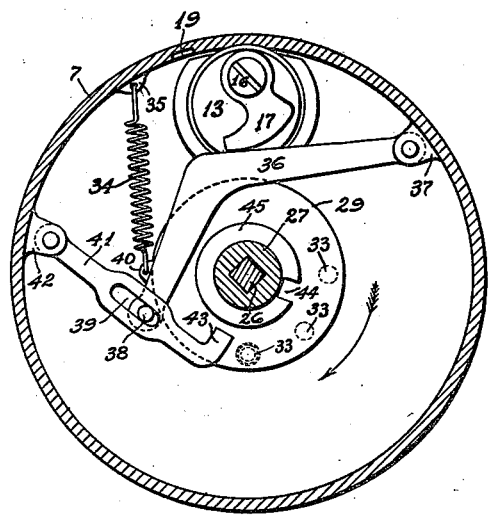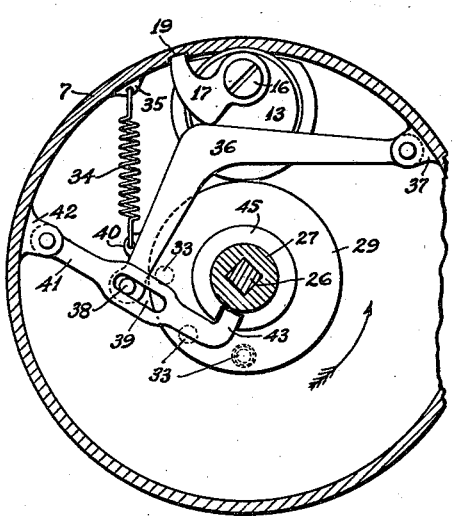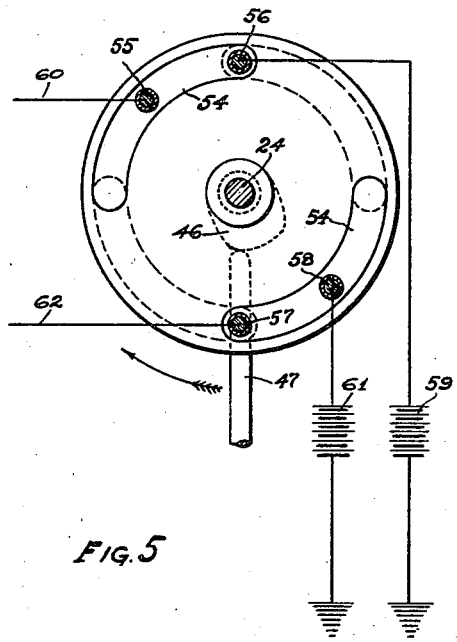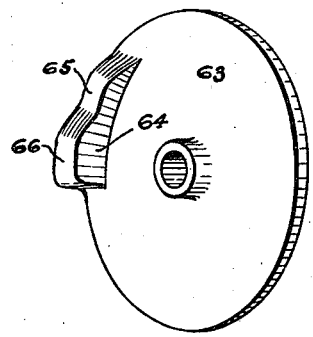

UNITED STATES PATENT OFFICE.

GEORGE L. LOTZ AND JOHN W. KREMER, OF SEATTLE, WASHINGTON.

AUTOMOBILE-LOCK.

1,147,634.    Specification of Letters Patent.    Patented July 20, 1915.

Application filed November 3, 1914. Serial No. 870,007.

*To all whom it may concern:*

Be it known that we, GEORGE L. LOTZ and JOHN W. KREMER, citizens of the United States, residing at Seattle, in the county of King and State of Washington, have invented a certain new and useful Improvement in Automobile-Locks, of which the following is a specification.

Our invention relates to improvements in mechanism for locking operative parts of automobiles, and the object of our invention is to provide a key-controlled mechanism which is adapted to be operated to obstruct the flow of fuel into the engine cylinders of an automobile, to break the electric circuit through which flows its ignition current, to make inoperative any form of starting mechanism of such automobile, and, further, to lock in an open position valves controlling a passageway into the compression ends of the engine cylinders of such automobile whereby one may leave such automobile locked in a non-operative condition so that an unauthorized person without a key cannot make use of it.

We accomplish this object by devices illustrated in the accompanying drawings wherein—

Figure 1:
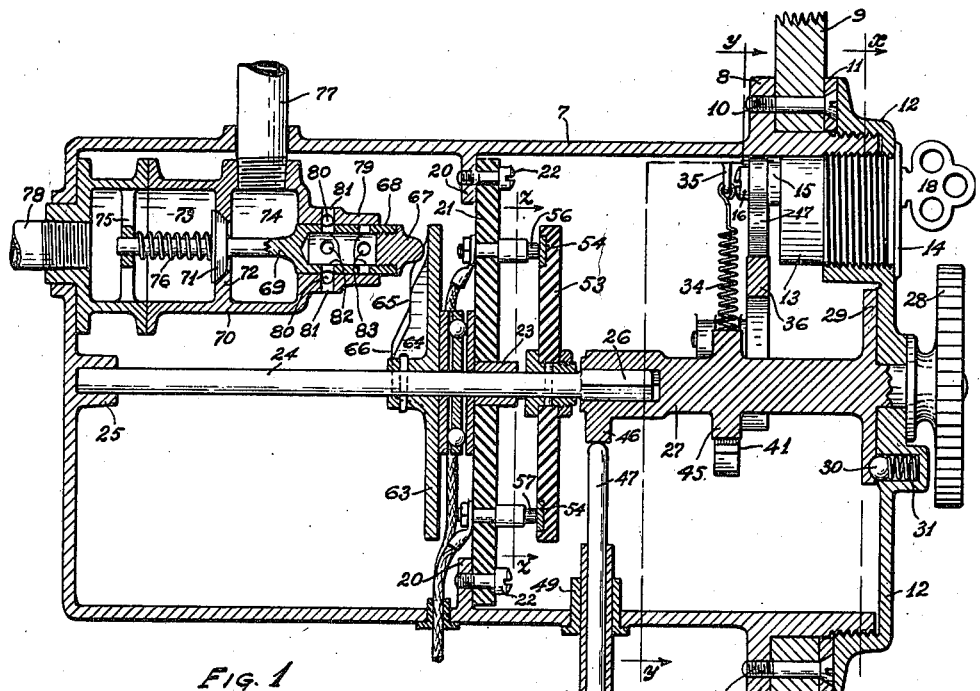
Figure 2:
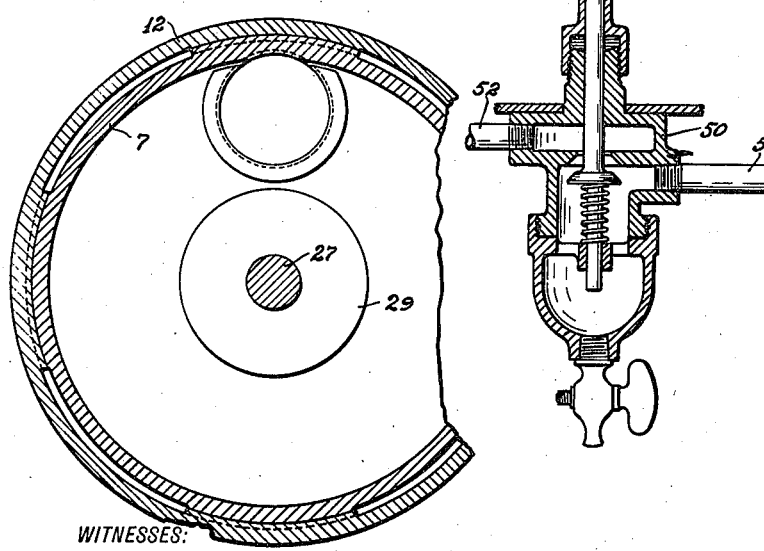

Figure 1 is a view in longitudinal midsection of a structure embodying our invention; Fig. 2 is a view of the same in vertical cross-section on broken line $x$, $x$ of Fig. 1, Fig. 3 is a view of the same in vertical cross-section on broken line $y$, $y$ of Fig. 1; Fig. 4 is a view of the same in vertical cross-section also on broken line $y$, $y$ of Fig. 1 but showing some parts in different operative positions from the positions of like parts shown in Fig. 3; Fig. 5 is a view in vertical cross-section on broken line $z$, $z$ of Fig. 1 showing parts of commutating mechanism adapted for controlling an ignition circuit and the circuit of an electrically operated starter, and Fig. 6 is a view in perspective of a detail of my invention.

Referring to the drawings, throughout which like reference numerals indicate like parts, an inclosing case 7, of cylindrical form preferably made of cast metal, is provided with an integral flange 8 disposed near one of its end portions, and such end portion is disposed to project through a wall 9 of an automobile (which wall 9 is indicated only by a fragmentary view in Fig. 1), the flange 8 engaging with the surface of the inner side of the wall 9 in which position it is secured by screws 10 and an annular washer 11, the screws 10 having their heads countersunk to be flush with the outer surface of the annular washer 11. That portion of the casing 7 which projects through the wall 9 and beyond the annular washer 11 is provided with an external screw-thread and on such screw-threaded portion is disposed an end cap 12 provided with an internal screw-thread which engages with said externally screw-threaded portion of the case 7.

In order that the end cap 12 may quickly be screwed into its position to cover the open end of the inclosing case 7 we have removed four equi-distant circumferential portions from both the internal screw-thread of the end cap 12 and the external screw-thread of the projecting end portion of the inclosing case 7, as more clearly indicated in Fig. 2, whereby when the end cap 12 is turned in a contra-clockwise direction for an eighth of a revolution then such cap 12 can be directly drawn outwardly and off the end of the case 7 and to replace such cap 12 the several circumferential portions of its internal screw-thread are disposed to register with the corresponding spaces that are between the circumferential portions of the exterior screw-thread of the case 7, and then such cap 12 is moved to engage with the surface of the washer 11 or near thereto and thereupon turned in a clockwise direction for a distance of an eighth of a revolution or for such distance as will make the cap 12 forcibly engage with the surface of the washer 11, as indicated in Fig. 1.

The end cap 12 is provided with an inwardly flanged and internally screw-threaded opening extending through it in such position that an arc of its outer circumference projects within the inner circumferential circle of the wall of the inclosing case 7 and that portion of such wall within which projects the outer circumference of said opening is also screw-threaded whereby the screw-threaded portion of a barrel 13 of a lock 14 may be screwed into said opening when the cap 12 is forced against the washer 11 so that the screw-threads on the barrel 13 may engage with the screw-threaded arc-like portion in the wall of the case 7 thus to interlock the cap 12 in its circumferential position on the end of the casing 7 so that such cap 12 cannot be moved circumferentially to unscrew it. Projecting from the inner end of the barrel 13 of the lock 14 is the inner end portion of the locking cylinder 15 of the lock 14 and on such end portion is secured by a screw 16, a cam lever 17, as more clearly shown in Figs. 3 and 4.

The lock 14 is provided with a key 18 and is so constructed that such key 18 can be withdrawn from the lock 14 only when the locking cylinder 15 is in its locked position and when in such locked position, as shown more clearly in Fig. 4, the tip end of the cam lever 17 is disposed to project into a recess 19 (which recess 19 is formed on the inner side of the wall of the inclosing case 7) thus to prevent one from unscrewing and removing the lock.

Within the inclosing case 7 and integral therewith is provided an annular flange 20 to which is secured a disk 21 by means of screws 22 which disk is made of material that is a non-conductor of electricity and extending through the central portion of said disk is a fixed metal bushing 23 which serves as a bearing for a shaft 24 which is disposed concentrically with the case 7 to extend from a bearing 25 (formed by a boss on the inner side of the end wall of the case 7) to and through the bushing 23 to such distance that its end portion 26, which is square in cross-section, may freely project into a square hole that is formed in the inner end portion of a spindle 27 which is rotatable in a concentrically disposed bearing that extends through the end cap 12, the projecting outer end of said spindle being provided with a knob 28 secured thereon whereby said spindle 27 may be rotated by one's hand.

The spindle 27 is provided with an integral flange 29 which is disposed to engage with the inner surface of the cap 12 and at three different points on a concentric circular line on that side of the flange 29 which engages with the inner surface of the cap 12 are provided semi-spherical recesses 33, as indicated by dotted lines in Figs. 3 and 4, each of which recesses 33 is adapted to admit a portion of a metal ball 30 which together with a helical spring 31 is disposed within a recess formed in the inner surface of the cap 12, as indicated in Fig. 1, said helical spring always acting to exert its force to press the ball against the flange 29 whereby the ball and the said semi-spherical recesses may coact to yieldingly hold the spindle 27 in a desired one of three different circumferential positions.

As shown more clearly in Figs. 3 and 4, a helical tension spring 34 has one of its ends connected to a lug 35 which is integral with the inner side of the case 7 while its other end is connected to a lug 40 that projects from the edge of a lever 36 one end of which lever 36 is articulated with a lug 37 that is also integral with the inner side of the case 7 and the other free end of said lever 36 is provided with a stud 38 which projects sidewise therefrom to extend through a slot 39 which is provided in a lever 41 one of whose ends is articulated with a lug 42 which is also integral with the inner side of the case 7 while its other free end portion 43 is turned to a right angle to adapt it to engage with a notch 44 which is provided in the periphery of a disk-like flange 45 provided integrally with the spindle 27, whereby the helical spring 34 acting through the lever 36 and its stud 38 may always tend to force the end portion 43 of the lever 41 against the periphery of the disk-like flange 45 thus to cause such end portion 43 to enter the notch 44 when the spindle 27 is moved circumferentially to a position where said notch 44 registers with said end portion 43 thus to lock said spindle in such circumferential position.

The cam-lever 17 is disposed to adapt it to engage with the edge surface of the lever 36 so that by turning the locking cylinder 15 the lever 36 may be actuated to force the end portion 43 of the lever 41 out of the notch 44, as shown in Fig. 3, or to permit the spring 34 to actuate said lever 36 to cause said end portion 43 to enter the notch 44 of the disk 45 to lock the spindle 27 in the position shown in Fig. 4, and only when the cam-lever 17 is in such position, as shown in Fig. 4, can the key 18 be withdrawn from the lock 14.

On the inner end portion of the spindle 27 is provided a cam-like projection 46 which, as the spindle 27 is rotated, may engage with the rounded end of a valve-stem 47 to depress such valve-stem 47 and such valve-stem 47 is disposed to extend outwardly through a tube 48 which enters the case 7 through a bushing 49 said tube 48 being connected with a valve 50 with which the valve-stem 47 is associated whereby a rotation of the spindle 27 may actuate the valve-stem 47 to operate the valve 50 to control the flow of fluid fuel from a pipe 51 leading to a source of supply (not shown), to a pipe 52 leading to the carbureter (not shown) of the automobile to which the structure is attached, thus when the key is in a position that unlocks the lock 14; as shown in Fig. 1, then the valve 50 will admit fluid fuel from the fluid tank to the carbureter, but when said key 18 is turned to lock the lock 14 then the valve 50 will close the passageway from pipe 51 to pipe 52 to make it impossible for the carbureter to be supplied with fuel.

Mounted securely on the shaft 24 at a point between the bearing 23 and the end of the spindle 27 is a disk 53 made of a material that is a non-conductor of electricity and on the innermost side of said disk 53 are inlaid two oppositely disposed commutator plates 54 of a form of a segment of a circle that is concentric to the shaft 24, as more clearly indicated in Fig. 5; and fixed withing the stationary disk 21 are four yielding electrical contact points 55, 56, 57 and 58 which are disposed in the path of the commutator plates 54 whereby when the shaft 24 is rotated by the spindle 27 the contacts 56 and 57 may be engaged or disengaged, as may be required, with the respective ones of the commutator plates 54.

As shown in Fig. 5, the contact 56 is connected with one terminal of a battery 59 whose other terminal may be connected with a metal portion (not shown) of an automobile while the contact 55 may be connected by a wire 60 leading to the electrical circuit which controls the ignition circuit of the automobile while the contact 58 is connected with one terminal of the battery 61 whose other terminal is connected to a metal part, (not shown) of the automobile while the contact 56 may be connected by a wire 62 with a circuit (not shown) which may control an electrically operated self starting device (not shown) of a desired form of which several forms are well known; thus a revolution of the knob 28 when the spindle 27 is unlocked may operate to open or close, as may be required, the electrical circuits within which the batteries 59 and 61 are included.

Fixed on the shaft 24 a short distance from the disk 21 is a disk 63 which is provided with a cam 64 which is formed to have two steps 65 and 66 and which projects from the innermost side thereof at a point adjacent to its rim, in the path of which cam 64 is the rounded end of a screw-threaded stud 67 which is screwed into the hollow end portion 68 of a valve spindle 69.

The valve spindle 69 is disposed to extend in a lengthwise direction within a valve case 70 and is provided with a valve-disk 71 which is adapted to engage with its seat disposed in an opening which extends through a partition 72 which partition 72 divides the space within the valve case 70 into two chambers 73 and 74. The smaller and solid end of the valve-stem 69 is guided by a spider bearing 75 and between such spider bearing 75 and the valve-disk 71 is a helical compression spring 76 which surrounds the valve-stem 69, which spring 76 tends to force the valve-stem 69 in a direction to force the valve-disk 71 into its seat to close the opening through the partition 72. An inlet pipe 77 leading from a source, not shown, of air under pressure is disposed to project through the wall of the case 7 to screw into the valve-case 70 through which pipe 77 compressed air may be conducted into the chamber 74 within the valve-case 70 and from the end of the valve chamber 73 projects outwardly a pipe 78 which leads to the compression chamber (not shown) of one of the cylinders of the automobile, as clearly shown in Fig. 1. The hollow end portion of the valve-stem 69 extends outwardly from the chamber 74 through a closely fitting hole that extends through a hub-like projection 79 (which is formed on the right hand end of the valve-case 70) and is adapted to be slidably movable therein and in the inner surface of such hole is cut a grooved channel 80 into which channel 80 a plurality of holes, as holes 81, are drilled through the hub 79 whereby air may pass out of said channel 80. The said hollow end portion of the valve-stem 69 is provided with two series of holes 82 and 83 that extend from its periphery to the hollow space within which series of holes 82 and 83 are disposed at different longitudinal points, the series of holes 82 registering with the grooved channel 80 when the stud 67 is not in contact with the cam 64, in which position the series of holes 83 are closed by the inner surface of the hole through the hub 79 and also in such position the valve-disk 71 rests in its seat to close the opening through the partition 72, but when the knob 28 turns the spindle 27 to cause the cam 64 to force the valve-stem 69 inwardly until the stud 67 rests on the cam-step 65, then in such position both series of holes 80 and 82 will be closed while the valve-disk 71 will be forced from its seat to open the passageway through the partition 72 thus to permit compressed air to pass from the pipe 77 into the pipe 78, and when the spindle 27 is turned further until the cam-step 66 of the cam 64 is in engagement with the stud 67 then, in such position, the series of holes 82 will enter the chamber 74 while the series of holes 83 will register with the grooved channel 80 and the valve-disk 71 will be still further from its seat thus to permit air from the compression chamber (with which the pipe 78 may be connected) to escape through the chamber 73, thence through the partition 72 and through the chamber 74, thence through the series of holes 82 into the hollow space within the hollow end of the valve-stem 69, thence through the series of holes 83 into the grooved channel 80 and out of such grooved channel 80 through the holes 81 whereby no compression can be effected within a cylinder to which the pipe 78 is connected.

We have shown only one valve-case 70 and its associated mechanism for controlling a passageway to the compression chamber of one cylinder of an engine but in practice we employ as many of such controlling devices as there are cylinders in the engine, the valve-cases (as the valve-case 70) being disposed on a circle equal distances apart within the case 7 and in such cases we would have as many cams (like cams 64) on the disk 63 as there are cylinders in the engine.

Obviously, in the operation of the structure shown and described when the key 18 is not within the lock the knob 28 is locked and the stud 67 will rest on the cam-step 66 and other parts of the structure will be so disposed that no fuel can flow through the pipes 51 and 52 to the engine, no current of electricity can flow through the ignition circuit and if the automobile be equipped with an electrical starter no electric current can be conducted to such starter and if the automobile be equipped with a compressed air starter no compression can be effected within the cylinder.

To put the automobile into operative condition the key 18 is inserted in the lock 14 and then turned to unlock such lock 14 and thereupon the knob 28 is turned until the metal ball 30 falls into the middle one of the recesses 33 whereupon the valve 50 will open to admit fuel through pipes 51 and 52 to the carbureter and the ignition circuits will be closed to supply an ignition current, and the stud 67 will rest upon the cam-step 65 thus to actuate the valve-stem 69 to admit compressed air from the pipe 77 to the pipe 78 and therethrough into the compression chamber of the engine's cylinder to start the engine, and after the engine is started the knob 28 is turned further to cause the stud 67 to wholly disengage from the cam 64 whereupon, as shown in Fig. 1, the valve-disk 71 will rest on its seat to close the passageway between the pipes 77 and 78 still leaving open the passageway through pipes 51 and 52 and still leaving all electric circuits intact for normal operation. Upon leaving the automobile the knob 28 is turned to cause the stud 67 to rest upon the cam-step 66 thereupon the key 18 is turned to lock the lock 14 thus to close the valve 50, open the electric circuits and to make it impossible to effect compression in the engine's cylinder in the manner described.

Manifestly many changes may be made with respect to form, dimensions and arrangements of the parts of our invention without departing from the spirit thereof.

What we claim is:

1. In an automobile lock of the class described, the combination with an inclosing case that is adapted to be secured to an automobile said inclosing case having its open end covered by a removable cap, of a spindle rotatably mounted in bearings formed in said cap; a lock secured to said cap and disposed so that a movable portion of its mechanism projects into the space within said inclosing case, said lock being adapted to lock said cap in its closed position on said inclosing case; mechanism associated with said movable portion and with said spindle whereby said spindle may be locked in a fixed circumferential position in response to the turning of the key of said lock; an air-valve disposed within said inclosing case; mechanism associated with said spindle and with said air-valve whereby a rotary movement of said spindle may actuate said air-valve; a pipe adapted to connect said air-valve with the compression chamber of an engine cylinder; another pipe adapted to connect said air-valve with a source of compressed air; an electric switch disposed within said inclosing case; mechanism associated with said electric switch and with said spindle whereby said electric switch may be actuated in response to a rotary movement of said spindle; a fluid fuel controlling valve associated with said inclosing case; and mechanism associated with said fluid fuel controlling valve and with said spindle whereby said fluid fuel controlling valve may be actuated in response to a rotary movement of said spindle.

2. In an automobile lock of the class described, the combination with an inclosing case that is adapted to be secured to an automobile, said inclosing case having its open end covered by a removable cap, of a spindle rotatably mounted in bearings formed in said cap; a lock secured to said cap and disposed so that a movable portion of its mechanism projects into the space within said inclosing case, said lock being adapted to lock said cap in its closed position on said inclosing case; mechanism associated with said movable portion and with said spindle whereby said spindle may be locked in a fixed circumferential position in response to the turning of the key of said lock; an air-valve disposed within said inclosing case; mechanism associated with said spindle and with said air-valve whereby a rotary movement of said spindle may actuate said air-valve; a pipe adapted to connect said air-valve with the compression chamber of an engine cylinder and another pipe adapted to connect said air-valve with a source of compressed air.

3. In a lock of the class described, the combination with an inclosing case that is adapted to be secured to an automobile said inclosing case having its open end covered by a removable cap, of a spindle rotatably mounted in a bearing formed in said cap; a lock secured to said cap and disposed so that a movable portion of its mechanism projects into the space within said inclosing case, said lock being adapted to lock said cap in its closed position on said inclosing case; mechanism associated with said movable portion and with said spindle whereby said spindle may be locked in a fixed circumferential position in response to the turning of the key of said lock; an electric switch disposed within said inclosing case; electric conducting wires adapted to connect said switch with an electric circuit; and mechanism associated with said electric switch and with said spindle whereby said electric switch may be actuated in response to a rotary movement of said spindle.

4. In an automobile lock of the class described, the combination with an inclosing case that is adapted to be secured to an automobile, said inclosing case having its open end covered by a removable cap, of a spindle rotatably mounted in a bearing formed in said cap; a lock secured to said cap so that a movable portion of its mechanism projects into the space within said inclosing case, said lock being adapted to lock said cap in its closed position on said closing case; mechanism associated with said movable portion and with said spindle whereby said spindle may be locked in a fixed circumferential position in response to the turning of the key of said lock; a fluid fuel controlling valve associated with said inclosing case; and mechanism associated with said fluid fuel controlling valve and with said spindle whereby said fluid fuel controlling valve may be actuated in response to a movement to said spindle.

In witness whereof, we hereunto subscribe our names this twenty-fourth day of October A. D., 1914.

GEORGE L. LOTZ.
JOHN W. KREMER.

Witnesses:
FRANK WARREN,
O. JOHNSON.